United States Patent [19]

Thinschmidt et al.

[11] Patent Number: 4,809,363

[45] Date of Patent: Feb. 28, 1989

[54] METHOD FOR AUTOMATIC LEVEL MATCHING IN A LOCAL NETWORK, IN PARTICULAR A MULTICOMPUTER ARRANGEMENT, COMPRISING A BUS SYSTEM HAVING LIGHT WAVEGUIDES, FOR THE PURPOSE OF COLLISION RECOGNITION

[75] Inventors: Hans Thinschmidt, Germering; Franz Kurfess, Blaustein, both of Fed. Rep. of Germany

[73] Assignee: Siemens Aktiengesellschaft, Berlin and Munich, Fed. Rep. of Germany

[21] Appl. No.: 102,242

[22] Filed: Sep. 28, 1987

Related U.S. Application Data

[63] Continuation of Ser. No. 906,497, Sep. 12, 1986, abandoned.

[30] Foreign Application Priority Data

Sep. 25, 1985 [DE] Fed. Rep. of Germany ....... 3534207

[51] Int. Cl.$^4$ .............................................. H04B 9/00
[52] U.S. Cl. ..................................... 455/612; 455/607
[58] Field of Search ..................... 455/606, 607, 612; 370/85, 94; 350/96.16; 364/200

[56] References Cited

U.S. PATENT DOCUMENTS

4,376,278  3/1983  Jacobsthal ............................. 370/85
4,516,204  5/1985  Saver et al. ........................... 455/612

FOREIGN PATENT DOCUMENTS

3246241A1  6/1984  Fed. Rep. of Germany ...... 455/617

Primary Examiner—Robert L. Griffin
Assistant Examiner—Leslie Van Beek
Attorney, Agent, or Firm—Hill, Van Santen, Steadman & Simpson

[57] ABSTRACT

A method is disclosed for automatic level matching in a local network, particularly for a multicomputer arrangement, comprising an optical bus system, for the purpose of collision recognition. Given a required level matching, the process is executed such that a fundamental phase is provided in which level matching devices respectively individually assigned to the computers are synchronized with one another. A first matching phase is provided in which all level matching devices simultaneously execute a process for setting a reference voltage to the lowest received level, whereby the sum of all attenuation components of the signal path at the receiving side of the appertaining computer is taken into consideration. A second matching phase is provided in which all level matching devices successively execute a process for setting the transmission level of their own transmitter such that the emitted light power at its own receiver leads to the receiving power registered as lowest, whereby the sum of all attenuation components of the signal path at the transmitting side of the appertaining computer is taken into consideration.

9 Claims, 7 Drawing Sheets

FIG 3

STANDARDIZED LEVEL — ASYMMETRY <2dB

BALANCING REQUIRED

AT TRANSMITTER: TRANSMISSION LEVEL
AT RECEIVER: REFERENCE THRESHOLD

BALANCE

CONTROLLER

METHOD FOR AUTOMATIC LEVEL MATCHING IN A LOCAL NETWORK, IN PARTICULAR A MULTICOMPUTER ARRANGEMENT, COMPRISING A BUS SYSTEM HAVING LIGHT WAVEGUIDES, FOR THE PURPOSE OF COLLISION RECOGNITION

This is a continuation of application Ser. No. 906,447 filed Sept. 12, 1986, now abandoned.

BACKGROUND OF THE INVENTION

1. Field of the Invention

The present invention relates to a method of automatic level matching in a local network, particularly for a multicomputer arrangement, comprising a bus system having light waveguides and an optical star coupler, for setting a standardized level at all outputs of the star coupler for the purpose of collision recognition, whereby the information signal to be transmitted is converted into an optical signal by an electro-optical transmitter, the optical signal being coupled in a light waveguide. The optical signal transmitted via the light waveguide is converted into an electrical useful signal by an opto-electric receiver and the information signal is recovered from the electrical useful signal. A respective transmitter is provided for each node, for example, a computer, the light power which is dependent on the information signal and which is coupled into the light waveguide by the transmitter being variable in digital steps. A receiver constructed of DC-coupled amplifiers without gain control is respectively provided for each node, the receiver comprising an input stage for generating the useful signal, a first comparator stage for generating the information signal from the useful signal and a second comparator stage which is supplied with a reference voltage variable in digital steps which senses the level of the useful signal and emits a collision signal when the useful signal exceeds the reference voltage.

2. Description of the Prior Art

Among known local networks there are arrangements in which computer nodes communicate with one another via a bus system, for example an optical bus system having a star coupler. The bus access is controlled by various techniques which can be divided into two main groups; deterministic methods which make collisions impossible, for example time division multiple access (TDMA), and stochastic methods which permit collisions, for example carrier sense multiple access collision detection (CSMA/CD). Recognizing a collision as simply as possible, reliably and quickly is a problem existing given stochastic methods. It is essential that all nodes be able to recognize a collision, even those nodes which are not participating in a collision.

A collision recognition of the prior art can occur by information comparison, by phase/transit time comparison or by level comparison.

In the "SIELOCnet" (Siemens local network), the computer nodes, for example, communicate with one another via an optical bus system. In terms of structure and operation, the optical bus system must be adapted to the "SIELOCnet" requirements and objectives and must promote the same. Only in this manner can one obtain a logically-uniform, straightline overall system which can also fully develop the designed performance capability.

The optical bus system for this known local network is composed of an optical transmission system and of a network controller (NC). Among other things, the network controller assumes the control of the data transfer between the optical transmission system and a host computer, as well as the editing, parallel-to-serial conversion, coding and formatting of the data.

The optical transmission system is divided into the transmission path, the optical network and the transmitreceive module (known as "transceiver" in local networks). The optical network must do justice to the requirement for decentralized communication, i.e. request controlled. Moreover, it must be possible to modify the network configuration without interrupting operations in that the number of computer nodes is increased or decreased. For this purpose, it is possible to execute the optical network as an optical bus with a star coupler (forward mixer). The transceiver function is realized in a bus interface connection which, among other things, also assumes the modification and the optical-electrical conversion of the serial data signals of the network controller.

The available optical transmission system operates with adjustable electro-optical transmitters and DC-coupled, opto-electrical receivers. With respect to signaling, monitoring, coding, transmission speed and freedom from disruption, therefore, both the DC character of the transmission system and the particular advantages of the light waveguide (LWL) are exploited, in particular the insensitivity to electromagnetic disturbances, separation of potential between transmitter and receiver, no signal radiation and, as a result, no crosstalk, no sparking at fiber contact locations or, given fiber breaks, no ground loops, high bandwidth and low weight.

The star coupler employed given an optical bus can be a forward mixer or a reflection mixer. Given the forward mixer, all inputs are located at the one end face and all outputs are located at the other end face of the quartz laminae, the actual mixer. In the reflection mixer, one end face of the mixer laminae is mirrored. The inputs and outputs of the mixer are all placed at the second face of the laminae. Therefore, the laminae must be widened in this case and must be lengthened for a degree of mixing of equal quality. As a consequence of the mirror and the larger laminae, the losses are greater than given a forward mixer. Forward mixers are employed for "SIELOCnet".

Figure 1:
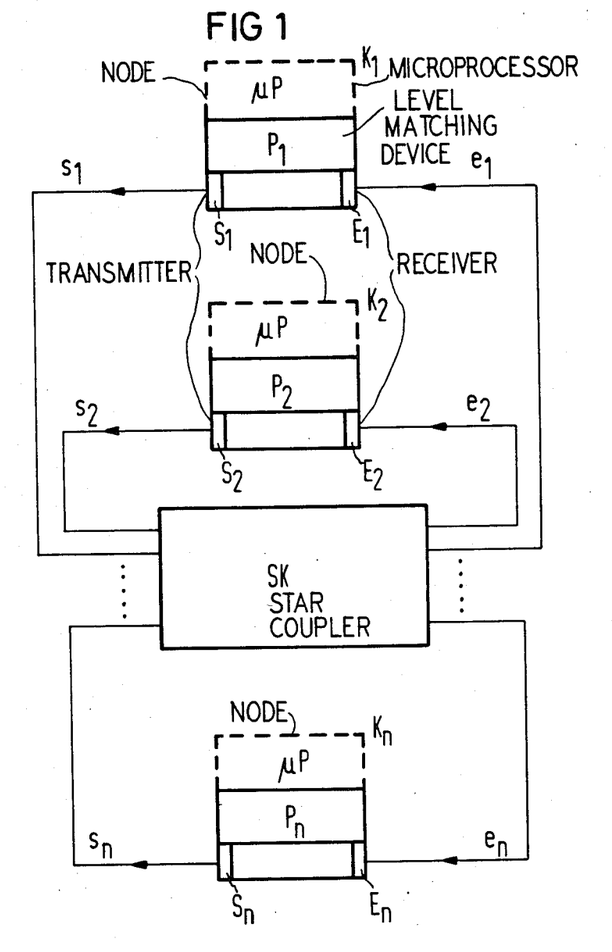
FIG. 1 is a schematic illustration in the form of a block circuit diagram of an optical bus system comprising n nodes and a common star couplers.

The logical bus function is realized in the mixer laminae. The optical signal which has proceeded from a computer node to an input of the mixer laminae is uniformly distributed to all outputs. Given utilization of a star coupler, the length of the optical bus is diminished to a point. The transmission lines $s_1 \ldots s_n$ and the receiving lines $e_1 \ldots e_n$ are viewed as leads to the optical bus. Topologically, an optical bus with a star coupler therefore looks like a star but is logically a true bus, cf. FIG. 1.

Only two hosts computers can communicate with one another simultaneously over the optical bus. The communication desires of the host computers must therefore be synchronized. The five known phases fundamentally apply for the transmission of a packet of packet-oriented data transmission on which the following is based: connection set up, beginning of the data transmission, data transmission, end of the data transmission and connection cleardown.

Given a bus access, the bus seizure corresponds to the connection set up and the bus release corresponds to the connection clear down. The bus access is controlled by the various methods set forth above. Independently of the bus access method, it is essential to allocate an unequivocal physical criterion to the respective bus states of busy or free. In the cases of a transmission with light waveguides, Continuous light↔Bus Occupied No light↔Bus free Due to the DC character of the optical transmission system, the coding and the character format can be liberally selected for the data transmission. An asynchronous character format, for example, is defined for "SIELOCnet". The data transmission cannot begin until the bus is occupied. The state "bus occupied" must therefore correspond to the quiescent condition for the data transmission. Related to the character format, that means: continuous light corresponds to "stop polarity".

The beginning of the data transmission is characterized by the start bit of the first character to be transmitted after the bus seizure. The time duration from the bus seizure up to the first start bit is freely selectable and is defined in the transmitter circuit of the network controller. This once-defined time duration is monitored and evaluated by the receiver circuit. The function of the serialto-parallel conversion is only started when the first start bit arrives within the monitoring interval. In this manner, variable light pulses which are longer than the monitoring interval can be transmitted for signaling purposes without starting the actual receiver function.

The end of the data transmission is identified by the non-arrival of further start bits. It is assumed that the transmitter circuit transmits all characters of a packet in gap-free succession. That is also indispensible for a good exploitation of the data channel. After the last character of a packet "stop polarity" must prevail as a packet and identification for a sufficiently long interval. Only then is the bus released. The same timer stage which is also utilized for the evaluation of the beginning of a data transmission can be employed for the evaluation.

Figure 2:
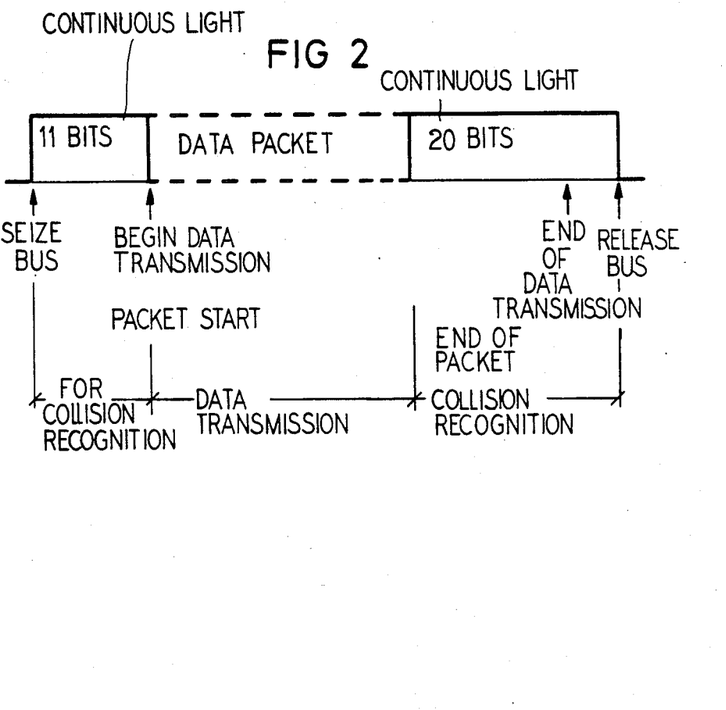
FIG. 2 is a schematic representation of a block frame for a data packet to be transmitted over the optical bus.

FIG. 2 illustrates the block frame of a data packet which meets both the requirements of an asynchronous transmission procedure as well as the requirement of a transmission protocol for an optical bus system. This definition spans the entire optical transmission system. The functions "block recognition", "data transmission", "collision recognition", and "special signaling" can be realized as a common concept.

In stochastic bus access methods, collisions occur when two or more computer nodes send a data packet roughly simultaneously (dependent on the system transit time). Given an optical bus with star couplers, a collision of data packets can occur only in a punctiform manner in the star coupler, since, of course, each computer node has a separate light wave guide assigned thereto for transmission and for reception, cf. FIG. 1.

A collision recognition can occur by way of level comparison, phase and transit time comparison or information comparison. A method for collision recognition should be realizable as independently as possible of the coding and should be realizable on the physical level of the "ISO layer model" of the ISO (international standards organization) in order to avoid complex algorithms in higher levels. As the most simple and straight line possibility, collision recognition by way of level comparison was selected for "SIELOCnet". This method is predestined for an optical bus with star couplers because collisions can only appear in a punctiform manner and the optical levels are falsified neither by in-scatterings nor by ground loops.

When a collision occurs, the corresponding optical levels add in the star coupler. This signal mixture reaches every computer node, even those computer nodes which are not participating in the collision. By evaluating this mixed level, each computer node directly recognizes a collision without a special signal ("jam signal") having to be additionally sent first to all computer nodes which are likewise not participating in the collision. A distinction is made between single level and two through n-fold levels. For a clear and reliable evaluation of a double level over a single level, the light levels occurring from arbitrary transmitters must appear of identical size for a defined receiver. For this reason, the optical transmission system must be matched. Due to the DC character of the optical transmission system, the sum levels can thereby be transmitted unfalsified. Linearity is necessary at least up to twice the value of the maximum, single level.

Given a collision of two data packets, the concept of collision recognition via level evaluation requires a level addition at least for the duration of a data bit, namely a level addition independently of the chronological relationship of the packets relative to one another and of the data content of the packets. In addition to the actual information, criteria which enable the receiver to produce a phase reference in the evaluation of the bit stream must also be transmitted in the serial data transmission. This can be achieved by auxiliary information (for example start-stop bit, SYN character) or code manipulation (for example scrambler, Manchester code). What is shared by all measures is that they must be cyclically repeated. Only in this manner can the phase reference be maintained during the entire duration of the data transmission. The repetition cycle is of different length in the individual measures and amounts, for example, in the manchester code to one bit, amounts of one character in the start/stop method, is dependent on the selected polynomial given use of a scrambler, and the stability of the clock generator is a crucial factor given utilization of SYN characters. When only the cyclically-reoccurring synchronization measures are taken into consideration for a level addition, then one is independent of the data content of the packets. The low addition always occurs when a continuous light pulse having the length of the repetition cycle of the appertaining synchronization measure superimposes with a data packet. This principle guarantees a collision recognition with 100% probability.

It is most advantageous to precede each data packet with a continuous light pulse of corresponding lengths. A level addition then occurs immediately at the beginning of a collision and is therefore recognized as early as possible. This agrees with the previous determination: therefore, occupation equals continuous light. On the basis of the selected asynchronous character format, the continuous light pulse at the beginning of the data packet is defined with 11 bits (about 1 character) length. Given a collision, a level addition of at least one bit length occurs when the bit stream is composed only of stop bits, i.e. the data are "OOH". The end of the data packet is marked with 20 bits (2 characters) continuous light. When a bus access from a computer node only occurs given a free bus ("carrier sense" function) and when the data packets are longer than the transmit time on the optical bus, then a collision for data packets can begin only at the beginning or during a data packet. When the data packets are shorter than the transit time on the optical bus or when the data bus access is arbitrary, a collision can also begin at the end of a data packet. The most universal case is to be covered for the collision recognition because the data packets are framed with continuous light pulses.

SUMMARY OF THE INVENTION

The object of the present invention is to provide a method of the type generally set forth above which avoids the disadvantages of the prior art which have been set forth by way of an automatic level matching. According to the invention, a method is provided in accordance with this object with whose assistance system modifications and/or system expansions may be governed without individual matching measures and in which each conditioned or changes of component characteristics relating to their electro and/or optical values caused for some other reasons cannot influence the operating reliability.

The above object is achieved, according to the invention, in a method for automatic level matching in a local network, particularly a multicomputer arrangement, comprising a bus system having light waveguides and an optical star coupler, for setting the standardized level at all inputs of the star coupler for the purpose of collision recognition. The information signal to be transmitted is converted into an optical signal by an electro-optical transmitter and the optical signal is coupled into a light waveguide. The optical signal transmitted via a light waveguide is converted into an electrical useful signal by an opto-electric receiver and the information signal is recovered from the electrical useful signal. A respective transmitter is provided for each node, for example, a computer, the light power which is dependent on the information signal and which is coupled into the light waveguide by the transmitter being variable in digital steps. A receiver constructed of DC-coupled amplifiers, without gain control, is provided for each node, each receiver comprising an input stage for generating the useful signal, a first comparator stage for generating the information signal from the useful signal and a second comparator stage which is supplied with a reference voltage, variable in digital steps, which senses the level of the useful signal and emits a collision signal when the useful signal exceeds the reference voltage. The method is particularly characterized in that, given a required matching level for the local network, a process is executed such that a fundamental phase is provided in which level matching devices ($P_1 \ldots P_n$) in all nodes ($K_1 \ldots K_n$) respectively individually assigned to these nodes are synchronized with one another. The method is further characterized in that a first matching phase is provided in which all matching devices simultaneously execute a process for setting the reference voltage to the lowest received level, whereby the sum of all attenuation components of the signal path is taken into consideration at the receive side of the appertaining node from the output of the star coupler up to the input terminal of the comparator stage and in that a second matching phase is provided in which all level matching devices successively execute a process for setting the transmission level of their own transmitter, executing the processes such that the transmitted light power at their own receiver leads to the reception power registered as lowest, whereby the sum of all attenuation components of the signal path is taken into consideration at the transmit side of the particular node from the output terminal of the transmission current source up to the input of the star coupler. The method is further characterized in that the local network has the same value at that input of the star coupler assigned thereto as all other transmission levels have at the appertaining, other inputs, so that, when two or more nodes simultaneously feed an information signal into the optical bus during normal operation of the local network, at least twice the value of the standardized transmission level occurs, this being acquired by the collision comparators respectively individually assigned to the nodes, whereby the condition of a collision is recognized at all nodes and a known collision disentangling algorithm is initiated.

BRIEF DESCRIPTION OF THE DRAWINGS

Other objects, features and advantages of the invention, its organization and operation will be best understood from the following detailed description, taken in conjunction with the accompanying drawings, on which.

DESCRIPTION OF THE PREFERRED EMBODIMENTS

Figure 3:
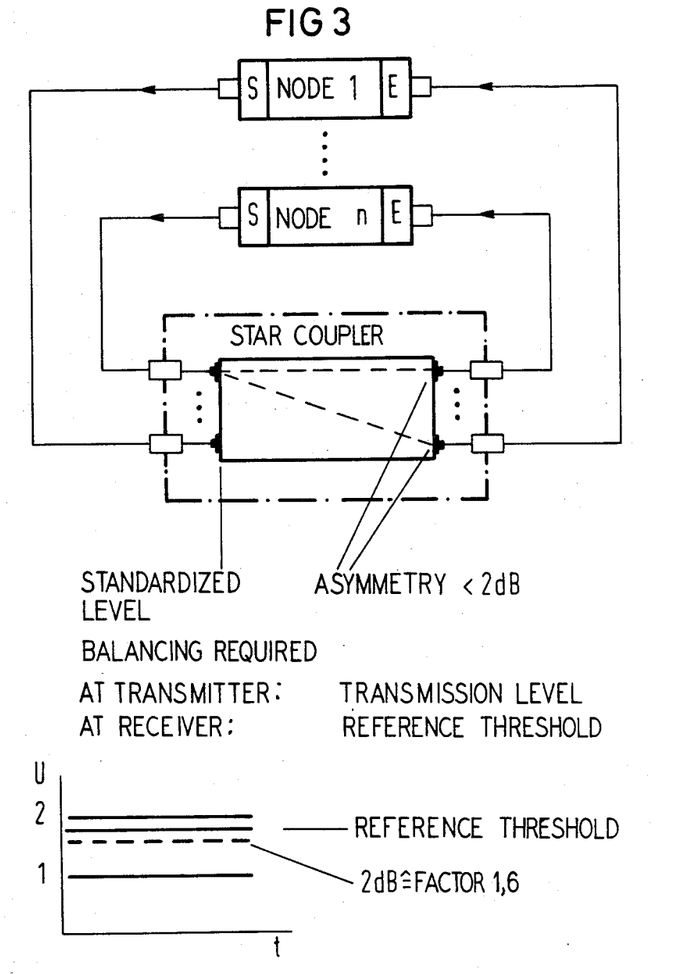
FIG. 3 is a schematic representation of collision recognition by way of level evaluation.

In order that every arbitrary transmitter S of nodes in the system appears with level of identical size for every receiver E, the optical transmission system is matched. The different attenuation of the transmission lines, including the plug junctions and the bonding locations at the mixer laminae of a star coupler, is taken into consideration by setting the transmission level. A standardized level then prevails at the input of the mixer laminae and the level of each arbitrary transmitter S is of the same magnitude at this location. The different attenuation of the receiving lines requires an individual setting of a reference threshold for the recognition of the two through n-fold levels at the receivers E (cf. FIG. 3).

For this purpose, the method of the present invention provides that, given a required level matching for the local network, a process is executed such that a fundamental phase is provided in which level matching devices $P_1 \ldots P_n$ in all nodes $K_1 \ldots K_n$ (cf. FIG. 1) which are respectively individually assigned to these nodes are synchronized with one another. A first matching phase is provided in which all level matching devices $P_1 \ldots P_n$ simultaneously execute a process for setting the reference voltage to the lowest, received level, whereby the sum of all attenuation components of the signal path is taken into consideration at the receiving side of the appertaining node from the output of the star coupler up to the inputs of the comparator stage. A second matching phase is provided in which all level matching devices $P_1 \ldots P_n$ successively execute a process for setting the transmission level of their own transmitter such that the emitted light power leads to that reception power registered at lowest at their own receiver. The sum of all attenuation components of the signal path at the transmitting side of the appertaining node is thereby taken into consideration from the output of the transmission current source up to the input of the star coupler. As a consequence thereof, the transmission level of each of the n nodes $K_1 \ldots K_n$ in the local network exhibits the same value at the input of the star coupler assigned thereto as to all other transmission levels at the appertaining, other inputs, so that at least twice the value of the standardized transmission level occurs when, during normal operation of the local network, two or more nodes simultaneously feed an information signal into the optical bus, this at least double value of the standardized transmission level being acquired by the collision comparators respectively individually assigned to the nodes, whereby the condition of a collision is recognized at all nodes $K_1 \ldots K_n$ and a known collision disentangling algorithm is initiated.

The matching process of the present invention, accordingly, is executed in two phases. In the first phase, each transmitter S of a computer node K successively presents itself with its maximum transmission level. The reference threshold of all receivers E are followed up to the respectively lowest level value. The individual value for each receiver E is stored. This value represents the greatest possible work level for a defined system configuration. In the second phase, each transmitter S is successively switched on and the transmission level is lowered until the level value stored in the first phase is established at the appertaining receiver E of the same computer node K. At the end of the second phase, all transmitters S are set such that a standardized level prevails at the input of the star coupler SK. All additional attenuation components, except for the asymmetry of the mixer laminae, can be compensated with this method. Asymmetry arises when the light, coming from different inputs, is not absolutely uniformly distributed to all outputs. The asymmetry should not be greater than 2 dB (a factor of 1.6) so that sufficient latitude remains for the setting tolerances of the transmitter and of the reference.

The required dynamics range of the receivers E is reduced due to the matching of the system. As a result of the standardized level, the receiver dynamics need only cover the maximum attenuation of the receiving lines when a computer node K having a line length of approximately 0 km and another computer node having a maximum line length of 1.5 km are simultaneously connected. The standardized level offers the further advantage that the signal-to-noise ratio relative to reflections is identical for all receivers E independently of the line length.

Manually matching the optical transmission system in accordance with the described method would be far too involved given a realistically-assumed plurality of computer nodes K and of the extent of the network. The automated matching procedure of the present invention is therefore advantageous. The automatic matching can be initiated by various criteria. For example, a further computer node K is connected to the network during operation and is activated, or the operating temperature of a computer has changed more than 10° C., a saving of compensation structure is thereby enabled. The initiation can also advantageously occur cyclically, for example after every 15 minutes.

Normal operation on the optical bus must be interrupted for the duration of the matching procedure. The automatic matching is started by a matching request which reaches each node K. The matching request can be a normal data packet having corresponding content or can be a special signal. A node K which has been newly added and has not yet been leveled in dares not send a data packet yet since a possible collision would not be perceived with certainty. Preferably, the matching request of a node K in the network is always signaled by a special signal on the optical bus.

It is advantageously provided, according to the present invention, that, when a criterion for a level matching arises in at least one node, for example a node $K_1$, the node $K_1$ feeds a light pulse into the bus system with its electrooptical transmitter $S_1$, this light pulse serving as a matching request signal and is of a different length than the pulses of the useful data flow and solicits each other node $K_2 \ldots K_n$ to interrupt the normal operating condition and to convert into a matching condition and, therefore, to initiate the fundamental phase at these nodes $K_2 \ldots K_n$ and at the node $K_1$ itself. In the fundamental phase, the digitally-adjustable transmission level and the digitally-adjustable reference voltage are set to their respective maximum value in all nodes $K_1 \ldots K_n$. A freerunning counter provided for a counting algorithm and controlled by a timer element and the timer element are set to zero in all nodes $K_1 \ldots K_n$. With the conclusion of the matching request signal, the fundamental phase is ended and the first matching phase begins synchronously at all nodes $K_1 \ldots K_n$, the free-running counter being started in this first matching phase, and each existing node $K_1 \ldots K_n$ offers its maximum transmission level (chronologically separated from the light pulses of all other nodes) as a matching pulse to all other nodes via the optical bus system, offering this maximum transmission level dependent on a node number individually assigned thereto and given a counter reading of the counter corresponding to the code number, namely given coincidence of the counter reading and node number. With the arrival of the matching pulse, the free-running counting is interrupted and the timer element is reset. The reference voltage is set to the respectively lowest, individually-different receiving level simultaneously at all nodes including the node which transmits the matching pulse, being set during the pulse duration. With the end of the matching pulse, the free-running counting is restarted. A fixed information regarding the maximally-possible number of nodes, this being preferably equal to the number of input/outputs of the star coupler SK, is stored in each of the nodes $K_1 \ldots K_n$. Given coincidence of the counter reading with this information, a criterion arises in every node $K_1 \ldots K_n$ by way of which the first matching phase is concluded and the second matching phase is initiated, the control events for the counter and the timing element sequencing therein as in the first matching phase. During the matching pulse, a unit's own transmission level is matched such to the value of the reference voltage individually stored in the first matching phase that the receiving level of the node, for example the node $K_2$, sending the matching pulse becomes identical to its individually-stored reference voltage. The second matching phase is ended in the same manner as the first matching phase. Subsequently, all nodes $K_1 \ldots K_n$ return from the matching condition into the normal operating condition.

Figure 6:
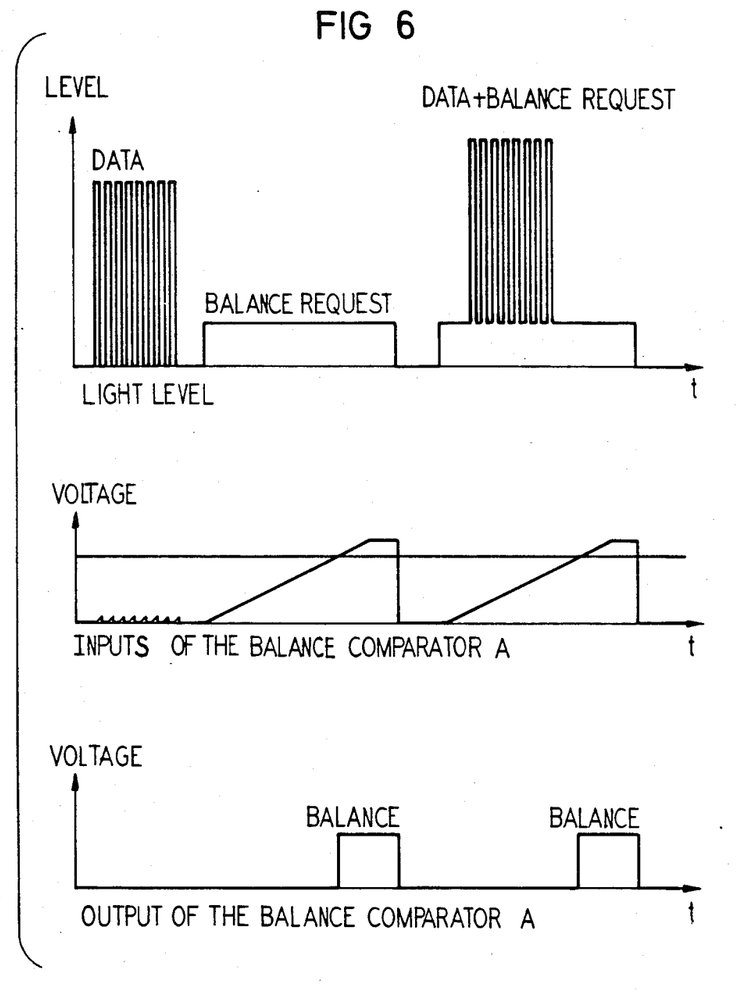
FIG. 6 is a plurality of diagrams illustrating the recognition of a special signal "match" on the optical bus.

The special signal is preferably defined as a continuous light pulse having a minimum length of 20 bits and is thereby reliably perceived at each computer node K, namely independently of whether or not it is superimposed with a data signal having an arbitrary level. The level of the special signal can only be boosted locationwise by a data signal, but cannot be reduced, cf. FIG. 6.

The matching request of a computer node K is transmitted according to rules of the bus access protocol. When an operating system having a high standardized level is expanded by a further, remote node, a collision is possible given transmission of the matching request, but this is not reliably perceived due to the low level of the special signal. The computer node which is the last to transmit a data packet before the recognition of the matching request advantageously repeats this data packet after the matching request in order to be on the safe side. All computer nodes throw out the last data packet received before the recognized matching request. The significance "collision" is additionally assigned to the criterion "matching request".

The matching procedure is started only with the end of the special signal. The special signals can overlap chronologically and arbitrarily and can arbitrarily overlap in level without the starting condition for the matching procedure changing. In practice, however, no computer node will generate a matching request when it has just recognized the matching request of some other node. The special signals then superimpose by a maximum of the system transit time of the optical bus and the recognition and reaction time in the computer nodes. The allowable superimposition of the special signals can be advantageously designationally employed for that case in which the normal length of the special signal is not adequate for the hardware to switch from normal operation to matching. In such a case the appertaining node can itself transmit continuous light after recognition of the matching request until it has completed the switch over to matching.

Figure 7:
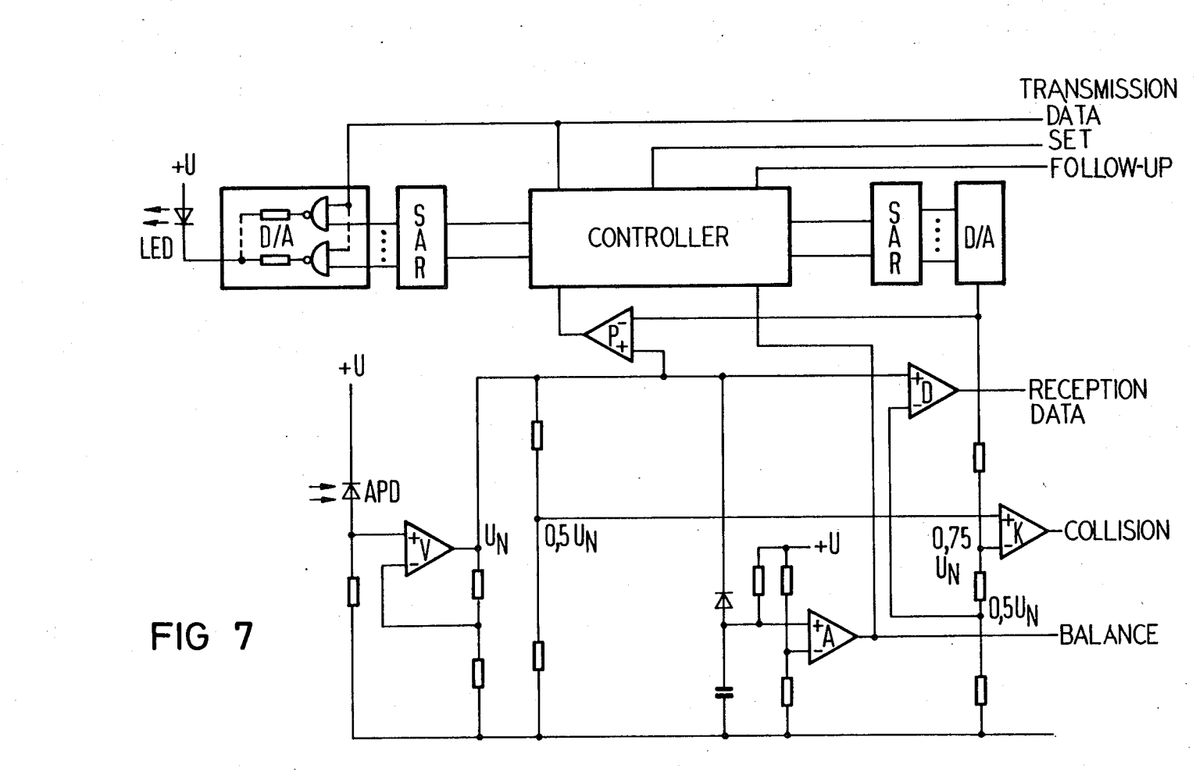
FIG. 7 is a basic circuit diagram of a preferred exemplary embodiment of the bus interface connection of FIG. 4.

The described algorithm is preferably individually realized in each node $K_1 \ldots K_n$ in the form of hardware. Required final control elements, digital-to-analog converters D/A memories, as well as successive approximation registers SAR are part of the aforementioned bus interface connection, cf. FIG. 7.

These units are controlled by software routines which are implemented in the network controller. In addition to the matching request, further continuous light pulses for following up the reference threshold for the collision recognition and for setting the transmission level for the standardized level must be transmitted. All continuous light pulses are preferably transmitted with the same length. For a matching event, a series of continuous light pulses arrives at the computer node, the first of these continuous light pulses being interpreted as a matching request and all others being interpreted as measuring pulses. The control of the automatic matching occurs via the three routines "initialization", "matching request" and "match".

The routine "initialization" is called in at the computer node by which the network is expanded or at all nodes when, given a reconfiguration of the network, the node numbers are newly assigned and/or the overall number of computer nodes is modified. For this purpose, a node number counter is first set to zero and the registers SAR are set to the highest value so that, first, a search is made for the lowest, received level and, second, transmission can be carried out with a full level. The current values for the respective, physical node number and for the overall number of nodes are then accepted by switches, PROM's or by a host computer.

The routine "matching request" starts, for example, a time generator module which generates the first continuous light pulse. This pulse must be generated by hardward since the same node must receive this pulse under software control and be interpreted as a matching request. As a result thereof, any arbitrary node or a plurality of nodes can simultaneously express a matching request.

Figure 5:
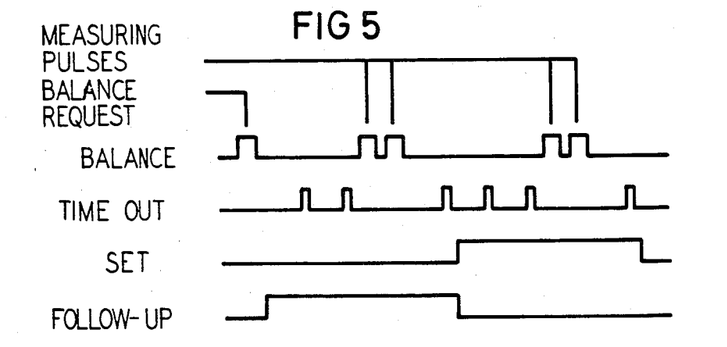
FIG. 5 is a signal diagram for signals which appear during a matching procedure.
Figure 8:
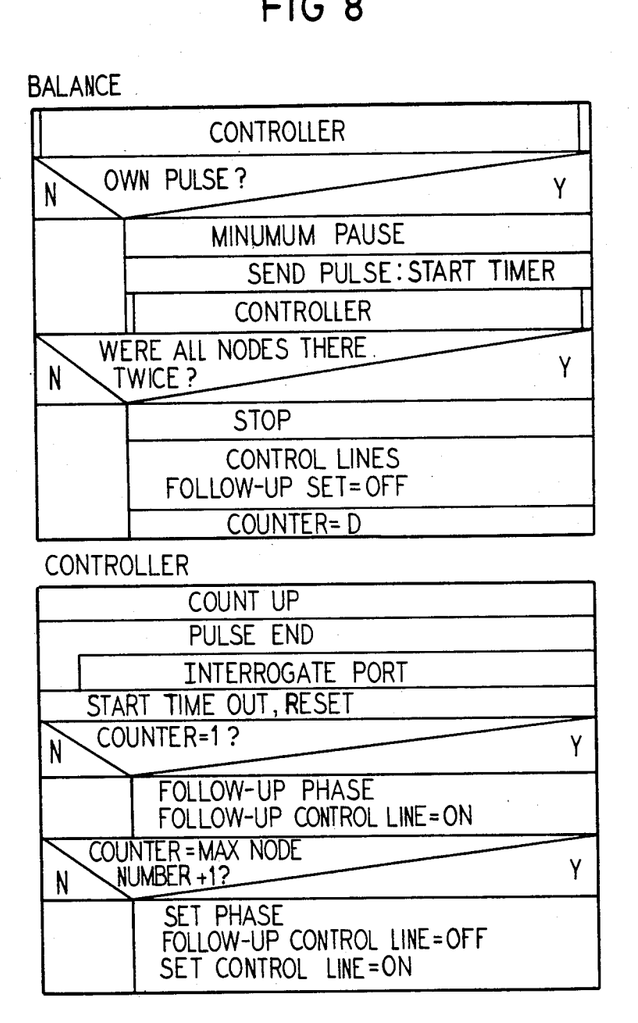
FIG. 8 is a pair of flow charts of function execution for the matching of an optical level in accordance with the method of the present invention.

On the basis of a counter algorithm, the "match" routine identifies the criteria for the control signals "followup" (first phase), "set transmitter" (second phase) and "transmit pulse". All nodes count the light pulses. As soon as the counter reading has reached the value of the physical address of a node, this node sends its light pulse. With the end of each light pulse, the monitoring interval is restarted in all nodes, this sequencing in all nodes when the node having the next highest node number has filled or is not present. When a plurality of nodes are missing in succession, counting is continued by chaining the monitoring interval, cf. FIG. 8. The "match" routine is initiated with the beginning of a received light pulse as well as beginning with the expired monitoring interval. FIG. 5 illustrates a complete matching procedure. In a network having five possible nodes, the nodes No.3 and No.4 are present (activated).

Figure 4:
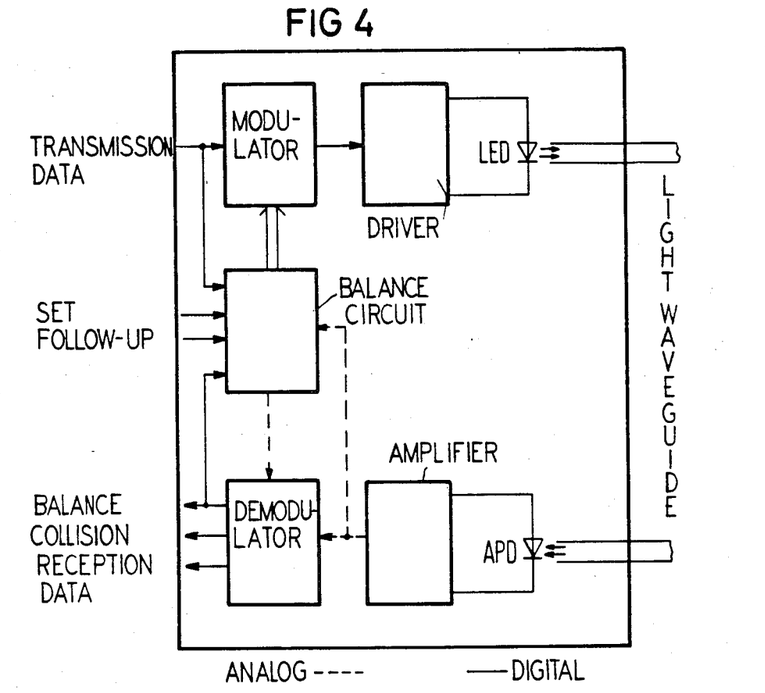
FIG. 4 is a block circuit diagram of a bus interface connector to be employed in the nodes.

As already mentioned, FIG. 4 illustrates the block circuit diagram of a bus interface connection. The serial transmission data coming from the network controller proceed to a light-emitting diode LED via a modulator and are amplified by a driver. The diode LED converts the electrical pulses into optical pulses and supplies the same to a light waveguide of the optical bus. Light pulses arriving from the optical bus are, in turn, converted into electrical pulses with an avalanche photo diode APD, are amplified and demodulated by way of a demodulator.

The reacquired received data are then available to the network controller for further processing. The demodulator also supplies the collision signal as soon as the individual reference threshold is set after the matching procedure is transgressed. The evaluated continuous light pulses in the automatic matching appear at a signal line "match", in particular at the third output of the demodulator. The network controller controls the automatic matching via the lines "set" and "followup".

Both of these lines are inactive during normal operation. When any computer node whatsoever transmits a matching request (first continuous light pulse) in this condition, the registers SAR are set to the highest value by the connection of the line "match" to a matching circuit. The network controller then need only control the phases "follow-up" and "set" in that it alternatively activates the appertaining control line. For the initialization of the first matching procedure when the network is placed in initial operation, the network controller must have the possibility of setting the registers SAR to the highest value for initializing the matching circuit. In this case, two control lines are simultaneously activated. As a result of a connection of a line "transmission data" to the matching circuit, the matching circuit can recognize when the actual continuous light pulse is sent. The appertaining transmitter may be set only in this case. The matching circuit is also offered the amplified, analog received signal. It supplies the analog value for the reference threshold of the collision recognition to the demodulator and the digital value of the transmission level to the modulator.

In accordance with the two phases of the matching algorithm, the matching circuit for the automatic matching within the bus interface connection is composed of a digital-to-analog converter for setting the transmission level and of a digital-to-analog converter for following up the reference for a collision comparator K. Both digital-to-analog converters are set by the registers SAR. The necessary control software is contained in a programmable logic array PLA. In accordance with the input values "set", "follow-up", "transmission data", and "match", the controller starts the appertaining register SAR and supplies the same with the current value of a level comparator P.

The digital-to-analog converter for setting the transmission level is preferably discretely constructed of an R/2R network and open collector gates. The appertaining SAR module defines the branches of the R/2R network which, dependent on the transmission data, excite the light emitting diodes in the desired intensity. The gates thereby simultaneously assume the function of a fast power driver.

The dynamic range of the receiver is limited by the operating voltage and the common mode range of the comparators because gain control is not employed. This limitation only has an influence in the phase "follow-up". An active receiver E having the lowest attenuation of the receiving line, the weakest transmission level at the input of the star coupler SK must only in a maximum reach the signal level which can be guaranteed by the appertaining digital-to-analog converter as the highest value. Only when this condition is met does the matching procedure sequence accurately.

An advantageous feature of the invention provides that a respective useful data packet is framed by two long light pulses, whereby these light pulses are longer than the period duration of the synchronization events for the useful information required for the type of coding employed, so that an occurring collision is reliably recognized.

Another advantageous feature of the invention provides that the pulse length of the matching request signal is varied in order to transmit different special signals in addition to the matching request signal.

Advantageously, the pulse length of the matching request signal is equal to that of the matching pulse.

It is further provided, according to another feature of the invention, that the node number and the information regarding the maximum node number are individually input, for example via a maintenance channel, into each of the nodes during the initialization phase of the network or given modification measures for newly-added nodes.

According to another feature of the invention, an alternative solution thereto provides that the node number and/or the information regarding the maximum node number in the network in operation can be modified in each of the nodes by useful data packets proceeding from every arbitrary node.

Finally, it is provided according to another feature of the invention that the information regarding the current network configuration, namely the maximum node plurality and the node numbers assigned to nodes in this region, is stored in each node of a network and may be fetched for every node.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for automatic level matching in a local network which comprises a plurality of nodes, a bus system having light waveguides connected to the nodes and an optical star coupler connected to the waveguides, for setting a standardized level at all input of the star coupler for collision recognition, whereby an information signal to be transmitted is converted into an optical signal by an electro-optical transmitter, the optical signal is coupled into a light waveguide, the optical signal is converted into an electrical useful signal by an opto-electric receiver and the information signal is recovered from the electrical useful signal, whereby a respective transmitter is provided for each node and has a light power which is dependent on the information signal and which is coupled into the light waveguide by the transmitter which is variable in digital steps, and whereby a receiver comprising DC-coupled amplifiers without gain control is respectively provided for each node, the receiver comprising an input stage for generating the useful signal, a first comparator stage for generating the information signal from the useful signal and a second comparator stage which is supplied with a reference voltage variable in digital steps which senses the level of the useful signal and emits a collision signal when a useful signal exceeds the reference voltage, and in particular comprising the steps of:

given a required level matching for the local network, executing a process to produce a fundamental phase synchronizing all level matching devices in all nodes with one another;

in a first matching phase simultaneously setting the reference voltage of all level matching devices to the lowest received level, whereby the sum of all attenuation components of the signal path is taken into consideration at the receiving side of the appertaining node from the output of the star coupler up to the input of the first comparator stage; and in a second matching phase successively setting the transmission level of each transmitter such that the transmitted light power at their own receiver leads to the receiving power registered as lowest, whereby the sum of attenuation components of the signal path is taken in consideration at the transmitting side of the nodes from the output of the respective transmission current source to the respective input of the star coupler, whereby the transmission level of each of the nodes in the local network has the same value at that input of the star coupler assigned thereto as all other transmission levels have at the respective other inputs of the star coupler so that when two or more nodes simultaneously feed an information signal into the optical bus during normal operation of the local network, at least twice the value of the standardized transmission level occurs and is acquired by collision comparators respectively individually assigned to the nodes so that the condition of a collision is recognized at all nodes for initiation of a known collision disentangling algorithm.

2. The method of claim 1, wherein:

in response to a criterion for level matching at at least one node, transmitting a longer light pulse distinguishable from the pulses of the useful data flow from the electro-optical transmitter of the node into the bus system as a matching request signal to solicit each other node to interrupt the normal operating condition and enter into a matching condition and therefore initiate the fundamental phase at all nodes;

in the fundamental phase setting the digitally adjustable transmission level and the digitally adjustable reference voltage to their respective maximum values to all nodes;

setting to zero a timing element and a free running counter controlled by the tim element for a counting algorithm in all nodes;

terminating the fundamental phase in the response to the end of the matching request signal to initiate the first matching phase synchronously at all nodes;

initiating counting in the first matching phase and transmitting the maximum transmission level from each node to all other nodes via the optical bus system with a matching pulse chronologically separated from the light pulses of all other nodes dependent on a node number individually assigned thereto and in response to a counter reading of the counter corresponding to the respective node number upon coincidence of the counter reading and the node number;

interrupting counting and resetting the timing element in response to the matching pulse;

setting the reference voltage to the respectively lowest individually different receiving level at all nodes including the node transmitting the matching pulse during the duration of the matching pulse;

restarting counting at the end of the matching pulse;

storing a fixed information regarding the maximally possible node plurality in each of the nodes;

in response to coincidence of the counter reading with the fixed information, ending the first matching phase to initiate the second matching phase and reoperating the counter and timing element in the second matching phase as in the first matching phase;

during the matching pulse matching the transmission level of a transmitter to the value of the reference voltage individually stored in the first matching phase such that the receiving level of the node transmitting the matching pulse becomes equal to its individually stored reference voltage;

terminating the second matching phase in the same manner as the first matching phase; and switching all nodes back from the matching condition to the normal operating condition.

3. The method of claim 1, and further comprising the step of:

transmitting a useful data packet framed by two long light pulses which are longer than the period duration of the synchronizing events for the useful information signal required for the type of coding employed so that a collision is reliably perceived.

4. The method according to claim 2, and further defined as:

varying the length of the matching request signal in order to transmit different special signals in addition to the matching request signal.

5. The method according to claim 2, and further defined as:

transmitting a matching request signal with a pulse length equal to that of the matching pulse.

6. The method of claim 2, and further comprising the step of:

realizing the algorithm required for the matching phases individually in each node by means of firmware.

7. The method of claim 2, and further comprising the step of:

storing the node numbers and the information regarding the maximum node number individually by way of a maintenance channel into each of the nodes in the initialization phase of the local network or upon modification by the addition of nodes to the network.

8. The method of claim 2 and further comprising the step of:

modifying the node number and the information regarding the maximum node number in each of the nodes of the network by transmitting useful data packets from any arbitrary node.

9. The method of claim 2, and further comprising the steps of:

storing information regarding the current network configuration and the node numbers in each node of the local networks; and fetching the stored information from any node.

* * * * *